United States Patent [19]

Gaa et al.

[11] Patent Number: 5,258,227
[45] Date of Patent: Nov. 2, 1993

[54] CHEMICALLY TREATED GLASS FIBERS WITH IMPROVED REINFORCEMENT PROPERTIES

[75] Inventors: Peter C. Gaa, Pittsburgh, Pa.; R. Alan Davis, Shelby, N.C.; H. Kenyon Watkins, Pittsburgh, Pa.

[73] Assignee: PPG Industries, Inc., Pittsburgh, Pa.

[21] Appl. No.: 386,003

[22] Filed: Jul. 27, 1989

Related U.S. Application Data

[63] Continuation of Ser. No. 128,358, Dec. 3, 1987, abandoned.

[51] Int. Cl.$^5$ ............................................. D02G 3/00
[52] U.S. Cl. ............................ 428/392; 428/375; 428/378; 428/391; 65/3.41; 65/3.43
[58] Field of Search ............. 428/375, 378, 391, 392; 65/3.41, 3.43, 3.44; 525/308

[56] References Cited

U.S. PATENT DOCUMENTS

| | | | |
|---|---|---|---|
| 3,405,084 | 10/1968 | Bohac et al. | 525/380 |
| 3,437,517 | 4/1969 | Eilerman et al. | 117/126 |
| 3,487,039 | 12/1969 | Root | 524/77 X |
| 3,876,405 | 4/1975 | Eilerman | 65/3 |
| 3,904,805 | 9/1975 | Johnson | 428/391 |
| 3,946,132 | 3/1976 | Hedden | 428/378 |
| 3,997,306 | 12/1976 | Hedden | 523/421 |
| 4,074,988 | 2/1978 | Eilerman et al. | 65/3 C |
| 4,110,094 | 8/1978 | Motsinger | 65/3 C |
| 4,147,833 | 4/1979 | Eilerman et al. | 428/378 |
| 4,207,071 | 6/1980 | Lipowitz et al. | 8/115.6 |
| 4,263,082 | 4/1981 | Temple | 156/309.3 |
| 4,374,177 | 2/1983 | Hsu et al. | 428/392 |
| 4,394,475 | 7/1983 | Temple et al. | 524/262 |
| 4,457,970 | 7/1984 | Das et al. | 428/391 |
| 4,518,653 | 5/1985 | McWilliams et al. | 428/378 |
| 4,615,946 | 10/1986 | Temple | 428/361 |
| 4,785,039 | 11/1988 | Algrim et al. | 524/188 |

FOREIGN PATENT DOCUMENTS

| | | | |
|---|---|---|---|
| 993283 | 7/1976 | Canada | 117/166 |
| 1192330 | 8/1985 | Canada . | |
| 1136548 | 12/1968 | United Kingdom . | |
| 1278484 | 6/1972 | United Kingdom . | |
| 1375035 | 11/1974 | United Kingdom . | |

OTHER PUBLICATIONS

Product Bulletin, Stepan Company, Northfield, Ill. 60093, Stepanhold R-1 date Mar. 1978.
Technical Information Sheet on Steprez R-2, Stepan Company, Northfield Ill. 60093 date May 28, 1987.
Encyclopedia of Polymer Science and Technology, vol. 14, pp. 242-243.

Primary Examiner—Patrick J. Ryan
Assistant Examiner—N. Edwards
Attorney, Agent, or Firm—Kenneth J. Stachel

[57] ABSTRACT

Chemically treated fibers of glass, carbon or polyamide have a treatment incorporating a copolymer or terpolymer with (vinylpyrrolidone-acrylate or acrylic moieties. In addition the treatment can have at least one film forming polymer, at least one organic/inorganic coupling agent, at least one fiber lubricant and water all in effective amounts to perform their stated functions. In one aspect of the invention the fibers are glass fibers which have a chemical treatment which is a dried residue of an aqueous chemical treating composition comprising at least one epoxy polymer, emulsion or dispersion in a predominant amount on a nonaqueous basis of the dried components amount of the aqueous chemical treating composition, at least one amino organofunctional silane coupling agent in an effective coupling agent amount, at least one cationic fiber lubricant in an effective lubricating amount and water. In this aspect the ratio of the epoxy to copolymer should be less than around 60 to 1.

28 Claims, 1 Drawing Sheet

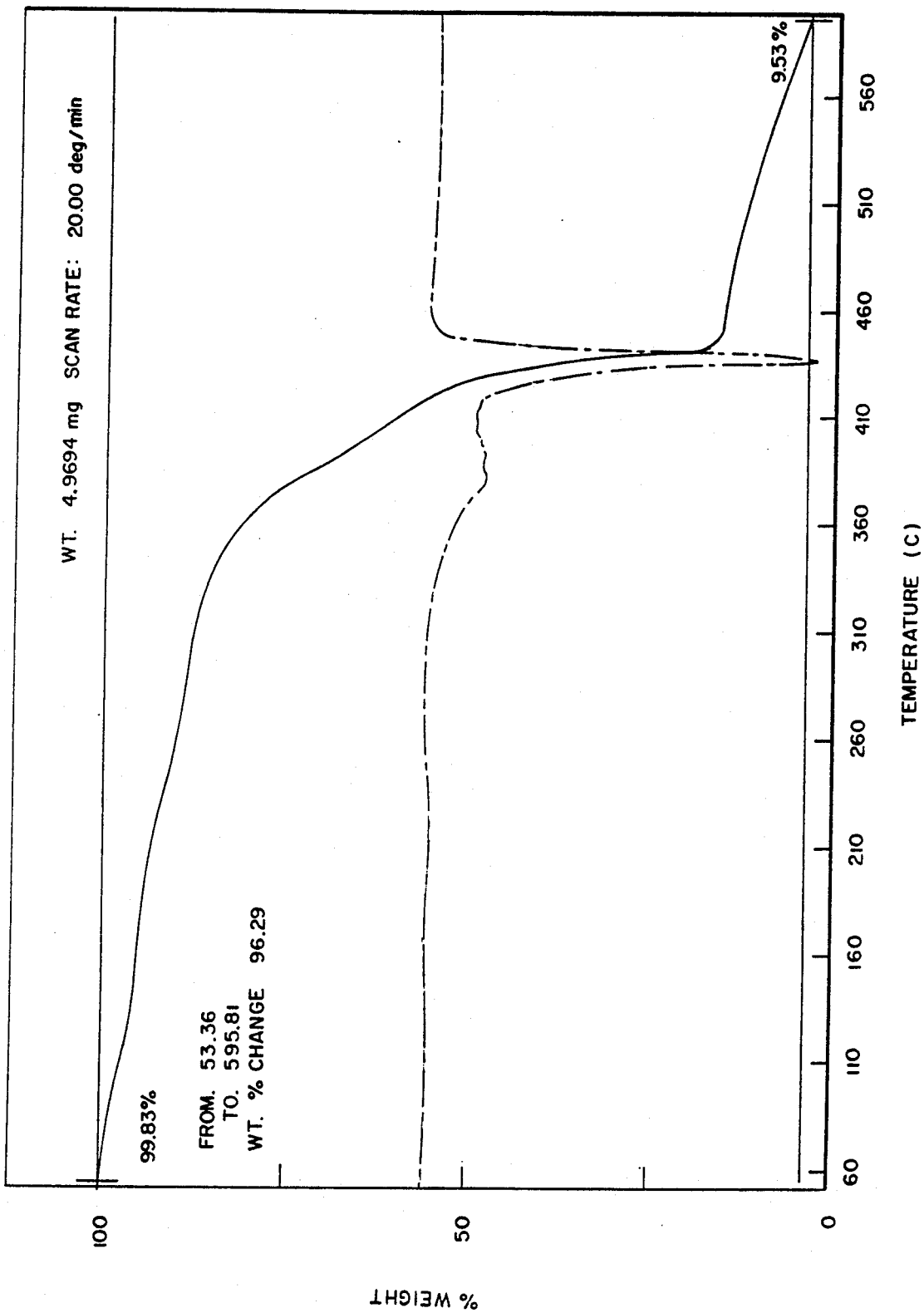

CHEMICALLY TREATED GLASS FIBERS WITH IMPROVED REINFORCEMENT PROPERTIES

This application is a continuation of application Ser. No. 07/128,358, filed Dec. 3, 1987 now abandoned.

The present invention is directed to chemically treated glass fibers having improved processing and reinforcement properties. More particularly, the present invention is directed to the treated fibers having such properties as good choppability, handling, integrity, thermal stability and resin wet-out, especially in phenolic-type resins and good thermal stability.

Polymer reinforcement is a major use of glass fibers by the FRP (fiber reinforced plastic) industry. Typically, the production of glass fibers entails formation of a plurality of fibers from molten streams of glass at speeds up to around 15,000 feet per minute. The glass fibers require protection from intrafilament abrasion during their production and improved compatibility between their hydrophilic smooth inorganic surface and the oleophilic organic polymers and resins they are to reinforce. The use of chemical treatments applied to the fibers during their formation has provided some of this protection and compatibility. Typically, the chemical treatments are aqueous solutions, foams or gels having film forming polymers, coupling or keying agents, lubricants and possibly processing aids. Recently replacement of asbestos with glass fibers in numerous applications has placed additional demands on the requirements of protection and compatibility needed for the glass fibers in these new applications. An example of one such application is the use of glass fibers replacing asbestos in breaklinings using phenolic resins as the matrix of the breaklining.

It is an object of the present invention to provide chemically treated glass fibers in continuous and chopped form for reinforcement of polymers where the treated glass fibers have one or more improved processing and reinforcement properties such as choppability, handling, integrity, wet-out in the matrix polymer, and thermal stability.

SUMMARY OF THE INVENTION

The foregoing objects and other objects gleaned from the disclosure are accomplished by chemically treated glass fibers having a copolymer or terpolymer or higher multiple-mer polymers of polyvinylpyrrolidone and acrylates and/or acrylics. The ratio of the mers in the copolymer or terpolymer can range from 99:1:0 to 1:99:0 to 1:0:99 for vinylpyrrolidone:acrylate:acrylic. This copolymer is the only component in an aqueous formulation, foam, or gel chemical treatment for the glass fibers or accompanies other components in an aqueous formulation, foam, or gel chemical treatment. Other components include: film forming polymers, organofunctional silane coupling or keying agents, Werner complex coupling agents, cationic and/or nonionic fiber lubricants, surfactants, processing aids and the like.

An additional aspect of the present invention is to have chemically treated glass fibers having an aqueous chemical treatment, wherein the nonaqueous components include: an epoxy polymer in an aqueous dispersion having a weight per epoxide greater than that for an epoxy monomer formulation that also has a minor amount of dimers, a cationic lubricant, a curing agent and an amino organofunctional silane coupling agent. The amounts of these components are effective amounts for the coupling agent, lubricant and curing agent and the ratio of the solids of the epoxy resin to the copolymer does not exceed around 60 to 1. When the copolymer is used in an aqueous chemical treatment, the acrylic acid-vinylpyrrolidone copolymer or terpolymer containing same can be neutralized to achieve greater dispersibility, emulsifiability or solubility than that for a poly(vinylpyrrolidone) homopolymer. The unneutralized poly(vinylpyrrolidone-acrylate) copolymer has solubility comparable to poly(vinylpyrrolidone) homopolymer. Also, the treated glass fibers can be dried to have the dried residue of the aqueous chemical treating composition.

BRIEF DESCRIPTION OF THE DRAWING

FIG. 1 is a thermal gravimetric analysis curve of a nonexclusive example of a poly(acrylic-vinylpyrrolidone) copolymer useful in the present invention. The figure shown indicates the possibility of improved thermal stability of a coating of poly(vinylpyrrolidone) copolymer having the acrylate monomer.

DETAILED DESCRIPTION AND PREFERRED EMBODIMENT OF THE INVENTION

The copolymer and/or terpolymer or higher multiple-mer product, hereinafter referred to collectively as copolymer, having the poly(vinylpyrrolidone) acrylate and/or acrylic involves any of these monomers that are copolymerizable with each other by processes known to those skilled in the art. The molecular weight of the copolymer is any molecular weight similar to any molecular weight of poly(vinylpyrrolidone) homopolymer. Nonexclusive examples include: formation in copolymers using solution polymerization in alcohol or with azo catalysts or emulsion polymerization using various catalysts as known to those skilled in the art. Also, in addition to reacting the monomers to form the copolymer, grafting of the acrylate and/or acrylic monomers into poly(vinylpyrrolidone) or N-vinylamide is possible; for instance, the acrylate monomers like ethylacrylate or 2-ethylhexylacrylate are grafted into the poly(vinylpyrrolidone) in an emulsion using an anionic surfactant with ammonium peroxydisulfate as a catalyst with temperature controlled by refluxing. In addition acrylate and/or acrylic monomers can be grafted into such polymers as poly-N-vinyl-2-pyrrolidone and other such poly(vinylamides) known to those skilled in the art. For instance, copolymers can be formed with the acrylic acid or sodium acrylate prepared in water solution with hydrogen peroxide at around 90° C. as is known to those skilled in the art. The ratio of the N-vinylamide monomer in either monomer or polymer form to the acrylate and/or acrylic monomer can be anywhere in the range of 99:1 to 1:99 but preferably the N(vinylamide) monomer constitutes a majority of the copolymer. It is preferred to have a terpolymer to achieve the desired glass transition temperature to assist in obtaining one or more of the following properties: higher thermal stability of a coating, and/or higher strand integrity for the glass fibers, and higher mechanical properties of glass fiber reinforced polymers. In forming the copolymer by monomer reaction any of the N-vinylamide monomers that are liquids or low melting solids at room temperature and soluble in water or organic solvents can be used and including such nonexclusive examples as: N-vinyl-N-methylacetamide, ethylacetamide, phenylacetamide, methylpropionamide, ethylpropionamide, methylisobutyramide, methylbenzamide; N-vinyl-2-pyrrolidone, N-vinyl-5-methyl-2-pyrrolidone; N-vinyl-3,3,5-trimethyl-2-pyrrolidone; N-vinyl-3-methyl-2-pyrrolidone. The acrylic monomers that can be polymerized with the aforementioned N-vinylamide monomers include any radical polymerizable acrylic including such nonexclusive examples as acrylic ester, methacrylic ester, diarylester, for instance, specific materials like methylmethacrylate, ethylacrylate, 2-ethylhexylacrylate, cyclohexylacrylate, acrylic acid, t-butylacrylate, methylacrylate, butylacrylate, and the like.

The copolymer should be dispersible, emulsifiable or soluble in water or in a organic carrier for water dispersibility for application to the glass fibers. Nonexclusive examples of carriers include: alcohols, for instance ethanol; butyl Cellosolve materials and the like. Copolymers with increasing amounts of alkyl acrylates lead to water insolubility. When the copolymer has just vinylpyrrolidone and alkyl acrylate functionality, the amount of the acrylate should not be too great to result in indispersibility in water. For instance, when the copolymer has an amount of vinylpyrrolidone of less than 70 parts to 30 parts of alkyl acrylate, increasing water solubility is possible by incorporation of some vinylpyrrolidone-reactable ionomer functionality and subsequent neutralization. When the copolymer has a vinyl pyrrolidone-reactable ionomer, water solubility can be increased through neutralization with basic compounds where water solubility is controlled by the percentage of neutralization. Other methods known to those skilled in the art for increasing the solubility of such copolymers can also be used. With the increasing amount of the acrylic acids in the copolymer, the hydrophilic character of the copolymer increases and also the adhesiveness and surface active properties usually increase.

A suitable example of a poly(vinylpyrrolidone) acrylate copolymer is the polyvinylpyrrolidone/ethylmethacrylate/methacrylic acid terpolymer available from Stepan Company, Northfield, Ill. under the trade designation Steppanhold R-1 or Steprez R-2. The latter material is an amine neutralized terpolymer of the vinylpyrrolidone ethylmethacrylate and methacrylic acid that is an amber liquid and has a 48–52 percent solids level and a viscosity in centipoise at 25° C. with a number 3 spindle at 6 rpm of 7,500 to 11,000 and a pH of 6.8 to 7.4 and a Gardner color of 4. This material has been neutralized to increase water solubility with an organic base preferably an evaporative base like an aminoalcohol such as 2-amino-2-methyl-1-propanol (AMP). This amino alcohol evaporates off the glass during drying of the treated glass fibers at elevated temperatures to result in reactable carboxylic acid groups. The most preferred ratio of the monomers is 68 percent of the poly(vinylpyrrolidone) with the remainder percentage constituted by the other two monomers, the methacrylic acid and the ethylmethacrylate. It is most preferred to have a majority of the remainder percentage constituted by the alkyl acrylate with a sufficient amount of methacrylic acid present to enhance water solubility. The amount of the copolymer present in a water for application of glass fibers can range from around 1 to 30 weight percent of the aqueous solution for application to the glass fibers. In such an instance the copolymer can be the sole protective colloid or film forming material in the aqueous treating composition.

In addition to the copolymer, numerous other components can be present to comprise a formulation for treating glass fibers. Such components include at least one or a mixture of the following: film forming polymers, organofunctional silane coupling agents, Werner complex coupling agents, cationic fiber lubricants, nonionic fiber lubricants, surfactants, processing aids, curing agents and the like. Numerous examples of non-crosslinking film forming polymers and crosslinking film forming polymers are provided in U.S. Pat. No. 4,263,082 (Temple) hereby incorporated by reference, and examples of coupling agents are disclosed in U.S. Pat. Nos. 3,946,132 (Hedden) and 4,110,094 (Motsinger) and 4,207,071 (Motsinger et al), and fiber lubricants disclosed in the aforementioned patents and U.S. Pat. No. 4,394,475 (Temple) and curing agents disclosed in U.S. Pat. Nos. 4,147,833; 4,074,988; 3,876,405 and 3,437,517 (Eilerman), all of these patents are hereby incorporated by reference. The amounts of the components in the formulation are those amounts effective in producing the film forming, or coupling agent or lubricating or curing effect.

A most suitable formulation of additional components with the copolymer of poly(vinylpyrrolidone-acrylate) includes one or more epoxy polymers, one or more amino organofunctional silane coupling agents, one or more cationic fiber lubricants, a curing agent and water.

Nonexclusive examples of suitable epoxy polymeric film formers include epoxy polymers as liquids, dispersions or emulsions; for example, the epoxy oil-in-water dispersion or emulsion (hereinafter referred to as an emulsion) disclosed in U.S. Pat. No. 4,615,946 (Temple) which is hereby incorporated by reference can be used.

One such epoxy polymer emulsion is that available from Interez, Inc., under the trade designation "EPI-REZ CMD W-60-5525" material. This epoxy resin has an epoxy resin dispersion which has 60 percent nonvolatiles and the only volatile material is water and the dispersion has a weight per epoxide of approximately 530, a pH of 8.3, and an average particle size between 1 and 4 microns. The most suitable epoxy resin is the epoxy resin dispersion available from Interez, Inc., under the trade designation CMD-W-35201 which has a percent solids of 60±2 and a viscosity LVT No. 4 at 30 rpm of 10,000±2,000. Preferably, the film forming polymer is one that forms a film at ambient conditions upon evaporation of the volatiles from the emulsion and the aqueous chemical treating composition or from the presence of a curing agent.

The amount of the oil-in-water emulsion with the epoxy film forming polymer present in the aqueous chemical treating composition is an amount of at least around 10 weight percent of the solids of the aqueous chemical treating composition. Generally the percent solids of the oil-in-water film forming emulsion is in the range of about 10 to about 80 weight percent. The amount of the epoxy polymer present in the formulation can range from about 1 to about 30 weight percent of the aqueous chemical treating composition for the epoxy polymer itself. Preferably the epoxy polymer is present in the chemical treatment in a predominant amount to the copolymer, but most preferably does not exceed an epoxy:vinylpyrrolidone ratio for an epoxy polymer having an epoxy equivalent of approximately 530 of greater than 60:1, where the poly(vinylpyrrolidone) copolymer has around 70 weight percent of the poly(vinylpyrrolidone).

Any monoamino or polyamino organofunctional silane coupling agent is useful in the chemical treating formulation. A particularly suitable aminofunctional organo silane coupling agent is the gammaaminopropyltriethoxysilane available from Union Carbide Corp. under the trade designation A 1100 material. The amount of the gammaaminopropyltriethoxysilane is in the range of about 1 to about 5 weight percent and equivalent amounts of the other aminosilane coupling agents can be used.

A suitable cationic lubricant for use in the formulation is a pelargonic acid amide of tetraethylene pentamine available as Cirrosol C-185A lubricant. Other similar cationic lubricants can also be used such as homologs of the tetraethylene pentamine or the pelargonic acid amide in equivalent amounts. The amount of the Cirrosol lubricant is generally in the range of about 1 to about 5 weight percent of the aqueous treating composition.

In addition it is preferred to have present an amount of curing agent to provide some degree of curing of the epoxy polymer. The curing preferably produces limited crosslinking to maintain the essentially linear characteristic of any predominantly linear epoxy polymers. A suitable epoxy curing agent is that available under the trade designation Amine O material which is a moderately strong monovalent tertiary amine base or a high molecular weight imidazoline which is a light brown liquid which may have granular solid particles present because of its melting point of around 41° F. Amino-O material is available from Ciba Giegy or ICI Chemicals. The amount of the curing agent is preferably in the range of about 1 to 5 weight percent of the aqueous chemical treating composition.

The water in the aqueous chemical treating composition is present in a sufficient amount to give a total solids (nonaqueous content) in the range of about 1 to about 50 weight percent and preferably about 5 to 20 weight percent. In any event, the amount of various components and the amount of water should be balanced so that the viscosity of the solution is not greater than around 150 centipoise at 20° C. Solutions having viscosities greater than 150 centipoise are difficult to apply to the fibers especially glass fibers during their formation from molten streams of glass with standard type application equipment without breaking the continuity of the fibers. It is preferred that the viscosity of the aqueous chemical treating composition for a wet chop process be in the range of about 20 to 60 centipoise at 20° C. for best results. If the aqueous chemical treating composition is prepared with thixotropic agents to make it a foam or gel, then the viscosity will be that appropriate to such formulations and the applying equipment will be appropriate for applying foams and gels to the glass fibers.

The aqueous chemical treating composition is prepared by addition of any of the components simultaneously or sequentially to each other, but it is preferred to predilute all of the components before they are added together and combined with water.

The fibers that are treated with the aqueous chemical treating composition are the high modulus fibers such as glass fibers, carbon fibers and polyaramide fibers. Suitable examples of glass fibers include "E-glass" or "621"-glass fibers and low or free boron or fluorine derivatives thereof. Aqueous chemical treating composition is applied to the fibers preferably in the forming operation and the fibers are formed into continuous strands, dried and chopped. Alternatively, the aqueous chemical treating composition is applied to the fibers in a wet chop forming operation. The amount of the aqueous chemical treating composition on the fibers is generally in the range of about 0.1 to about 2 percent LOI (loss on ignition).

When the aqueous chemical treating composition is applied to the fibers, the fibers can be dried in such a manner to avoid formation of undesirable colors, so the drying temperatures should not be too high to produce non-white colors from any heat sensitive components of the aqueous chemical treating composition. Upon drying, a moisture-reduced residue is formed on the fibers and these fibers are useful in reinforcing polymers especially phenolic polymers, homopolymers and copolymers. Generally, drying of the fibers occurs any time before the fibers contact the matrix polymer. The temperature of drying the chemically treated fibers to produce the moisture-reduced residue is in the range of around less than 350° F. (177° C.) with lower temperatures requiring longer drying times. Preferably the treated glass fibers are dried at a temperature in the range of about 280° F. to 290° F. for a period of time from 10 to 12 hours to reduce the moisture content of the fibers to about 0. The fibers, which include a plurality of fibers, are chopped into lengths that vary from around less than 1/16 of an inch to greater than 2 inches, but preferably in the range of about ⅛ of an inch to around 3/16 of an inch.

Not only do the reinforcing fibers benefit from treatment with the aforementioned chemical treating composition, but also inorganic fillers sometimes used in reinforced composites may benefit from such treatment. Nonexclusive examples of such inorganic fillers include mica, wollastonite, talc, clay, and novaculite. Contacting the fillers with the aqueous chemical treating composition by spraying or dipping or the like is a convenient way of treating them.

The dried fibers are used to reinforce polymeric matrices in any of the molding processes known to those skilled in the art utilizing either chopped strand or continuous strand or a mixture thereof. Preferably, the chopped fiber strands are mixed with the matrix polymer resin in a dry powder mixer to produce a homogenous batch of matrix polymer. The batch can be compression or injection molded to produce the fiber reinforced polymeric part or shaped device. These batches are used in molding the fiber reinforced polymer such as fiber reinforced phenolics.

PREFERRED EMBODIMENT

The preferred embodiment utilizes glass fibers that are dry chopped glass fibers having a dried residue of the chemical treating composition having a length of around 1/16 of an inch to 3/16 of an inch. Fibers have conventional filament diameters but are preferably of a diameter in the range of 10–16 microns. The aqueous chemical treating composition preferably has the formulations with ranges of amounts and most preferred amounts for the components as shown in Table A.

TABLE A

| | Weight % Dried |
|---|---|
| amino-organofunctional silane coupling agent | 1-5 |
| epoxy polymer dispersion | 50-80 |
| poly(vinylpyrrolidone)ethyl acrylate/methacrylic acid | 5-20 |
| first cationic fiber lubricant | 1-6 |
| epoxy curing agent or a second cationic fiber lubricant | 1-6 |

The formulation of Table A results from the addition of the components in the following manner. About ⅓ of the water of the total volume is added to a premixed tank and the amino organofunctional silane is added with stirring for 5 minutes and this material is transferred to a main tank. Another third of the water from the total volume of water is added to a premix tank and the poly(vinylpyrrolidone) copolymer which is a terpolymer of poly(vinylpyrrolidone) 67 weight percent/ethyl methacrylate 25 weight percent to methacrylic acid the remainder percentage which has been neutralized with a dialkyl amine such as dimethylethylamine to about 75 percent neutralization for increased water solubility. The addition is with stirring for around 5 minutes and this diluted mixture is added to the main mix tank. The epoxy resin as an epoxy resin dispersion having suitable surfactants is added to the main mix tank. About 1/6 of the total volume of water is added as hot deionized water to a premix tank and the cationic lubricant (cirrosol) is added to the water with stirring until dissolved and then transferred to the main mix tank. A small amount of acetic acid, around 0.25 grams to 1/6 the volume of water as hot water, are combined in a premix tank and the curing agent. Amine O or a second cationic lubricant is added with stirring until dissolved and transferred to the main mix tank. The mixture in the main mix tank is then diluted to the final volume.

The aqueous chemical treating composition is applied to glass fibers having a G fiber diameter of around 10 microns as they are formed from molten streams of glass issuing from a bushing. Although the composition can be applied to fibers of any diameter. The aqueous chemical treating composition has a percent solids of around 5 to 15 weight percent, pH of around 8.5 to 10 and a particle size of around 1.5 to 3. The treated glass fibers are gathered into one or more strands and wound into cylindrical packages on a winder which provides attenuation force to pull the fibers from the bushing. A plurality of packages are dried in an oven at about 285° F. for 11 hours. The dried packages are then unwound and chopped into ⅛ inch chopped fibers.

EXAMPLES

Table 1 presents 6 formulations of aqueous chemical treating composition used in the present invention and two aqueous chemical treating composition that are illustrative examples (I11). The values given in Table 1 are in weight percent of dry ingredients on the glass surface.

TABLE 1

| | Examples | | | | | | III 1 | III 2 |
|---|---|---|---|---|---|---|---|---|
| | 1 | 2 | 3 | 4 | 5 | 6 | | |
| epoxy resin | | | | | | | | |
| DER 331 Dow | — | — | — | — | — | — | — | 70.82 |
| Internez 35201 | 74.35 | 75.0 | 78.4 | 81.8 | 85.2 | 75 | 74.35 | — |
| surfactant Pluronic F-108 | — | — | — | — | — | — | — | 3.53 |
| poly(vinylpyrrolidone) PVP K30 | — | — | — | — | — | — | 14.19 | 14.19 |
| poly(vinylpyrrolidone)/ ethylmethacrylate/ methacrylic acid terpolymer | 14.19 | 13.60 | 10.20 | 6.8 | 3.4 | 13.60 | — | — |
| cationic fiber lubricant (Cirrosol C-185A) | 3.53 | 3.50 | 3.50 | 3.50 | 3.50 | 3.50 | 3.53 | 3.53 |
| Resin Curing Agent Amino-O | 3.53 | 3.50 | 3.50 | 3.50 | 3.50 | 3.50 | 3.53 | 3.53 |
| organosilane coupling agent A-1100 silane | 4.40 | 4.40 | 4.40 | 4.40 | 4.40 | 4.40 | 4.40 | 4.40 |
| solids | — | 9.6 | 10.0 | 10.1 | 9.97 | 9.95 | | 10.0 |
| pH | — | 9.1 | 9.1 | 9.2 | 9.2 | 9.1 | | 5.7 |

Glass fibers having a G fiber diameter were treated with the formulations of Table 1 and tested for handling properties and physical properties in reinforcing phenolic resins. The formulations were applied to glass fibers as in the preferred embodiment and dried chopped glass fibers were used to reinforce the phenolic resins. Table 2 presents data on the results of the testing for handling properties and physical properties.

TABLE 2

| | Examples | | | | | | III 1 | III 2 |
|---|---|---|---|---|---|---|---|---|
| | 1 | 2 | 3 | 4 | 5 | 6 | | |
| LOI % | 1.13 | 0.96 | 1.04 | 0.83 | 0.90 | 1.15 | 1.16 | 1.15 |
| Filamentation (%) high shear (low shear) | 8.0 | 0.5 | 0.5 (2) | 10 (6) | 11.1 | 0.5 | 10 | 55 (12) |
| Static (V/mm 87% RA) | 1.0 | 1.5 | 3.0 | 4.0 | 6.0 | 3.0 | 0 | 12 |
| TRS (× 10³) (psi) | 20.182 | 18.4 | 19.5 | 19.8 | 20.4 | 19.1 | 18.9 | 19.5 |
| TRS modulus (10⁶) (psi) | 1.23 | 0.83 | 0.83 | 0.87 | 0.87 | 0.85 | 1.19 | 0.82 |

⅛" chopped
TRS - transverse rupture strength (TRS) psi
Glass content - 20 percent of ⅛" glass fibers for all examples The filamentation test in Table 2 is conducted with a weighed portion of dried glass fibers and a weighed amount of crushed walnut shells. These materials are placed in a metal can and shaken on a paint shaker for the high shear test or on a wrist action shaker for the low shear test, where both tests are for 6 minutes. The walnut shells and intact glass fibers are separated from the resultant mixture and any fuzz balls by passing the mixture through screens. The fuzz balls are weighed, and the ratio of the fuzz weight to the starting glass fiber weight yields a percent filamentation at a specified time (6 minutes) of shaking. In the filamentation test the lower values indicate lower generated fuzz, higher strand integrity and better quality glass fibers.

The static test of Table 2 was conducted with a static gun on the glass after shaking for 6 minutes. The lower static value indicates the glass will not easily statically adhere to other surfaces indicating a higher quality glass fiber product.

The transverse rupture strength (TRS) test in psi is a flexural strength test and the TRS modulus is a flex modulus test conducted in accordance with ASTM standard test procedures.

From the results of Tables 1 and 2 it is seen that the aqueous chemical treating composition yields chemically treated glass fibers having improved processing and handling characteristics as shown by the filamentation and static tests over the prior art aqueous chemical treating composition of treated glass fibers of illustrative Examples 1 and 2. Also, the chemically treated fibers of the present invention give higher strength results in the TRS tests than the treated glass fibers having polyvinylpyrrolidone homopolymer in illustrative examples 1 and 2. These improvements are most evident from comparing the filamentation, static, TRS, and TRS modules test results of illustrative examples 1 and 2 to examples 1 through 6. At least one of these test results and in some cases several of them are improved for the examples of the invention over those for the illustrative examples.

We claim:

1. Strands of glass fibers wherein the fibers are treated with a chemical treating composition, where treating composition comprises:
   a. a poly(vinylpyrrolidone) copolymer selected from the group consisting of water dispersible, emulsifiable, and soluble poly(vinylpyrrolidone)-acrylic acid copolymers, poly(vinylpyrrolidone)-acrylate-acrylic acid terpolymer, poly(vinylpyrrolidone)-acrylate-methacrylic acid terpolymer, and mixtures thereof, wherein the ratio of the mers in the copolymer and terpolymer is in the range from 99:1:0 to 1:99:0 to 1:0:99 for vinylpyrrolidone:acrylate:acrylic and wherein the majority of the copolymer is comprised of vinyl pyrrolidone; and
   b. water in an amount to give a total solids in the range of about 1 to about 50 weight percent for application of the copolymer to the fibers.

2. Strands of glass fibers with a chemical treating composition of claim 1, wherein the copolymer is dissolved, emulsified or dispersed in an organic carrier.

3. Strands of glass fibers with a chemical treating composition of claim 1, wherein the copolymer is a terpolymer having a majority of the terpolymer comprised of vinyl pyrrolidone and a minor amount of acrylate and a water solubilizing amount of acrylic acid or methacrylic acid or mixture thereof.

4. Strands of glass fibers with a chemical treating composition of claim 3, wherein the terpolymer has a 67 weight percent of vinyl pyrrolidone, 25 weight percent of ethylmethacrylate and the remainder percentage as methacrylic acid.

5. Strands of glass fibers with a chemical treating composition of claim 3, wherein the terpolymer is neutralized with a basic compound to improve the water solubility of the terpolymer.

6. Strands of glass fibers with a chemical treating composition of claim 5, wherein the base is selected from the group consisting of amino alcohol and dialkyl amine.

7. Strands of glass fibers with a chemical treating composition of claim 1, wherein the chemical treating composition has at least one film forming polymer.

8. Strands of glass fibers with a chemical treating composition of claim 1, wherein the chemical treating composition has at least one coupling agent in an amount in the range of about 1 to about 5 weight percent.

9. Strands of glass fibers with a chemical treating composition of claim 1, wherein the composition has at least one lubricant in an amount in the range from about 1 to about 5 weight percent of the aqueous treating composition.

10. Strands of glass fibers with a chemical treating composition of claim 9, wherein the lubricants are cationic fiber lubricants which may also function as epoxy crosslinking or curing agents.

11. Glass fibers treated with a chemical treating composition, wherein the chemical treating composition comprises:
   a. at least one film forming polymer in an effective film forming amount,
   b. at least one organofunctional silane coupling agent in an effective coupling agent amount,
   c. at least one cationic fiber lubricant in an effective lubricating amount,
   d. poly(vinylpyrrolidone) copolymer selected from the group consisting of water dispersible, emulsifiable, and soluble poly(vinylpyrrolidone)-acrylic acid copolymers, poly(vinylpyrrolidone)-acrylate-acrylic acid terpolymer, poly(vinylpyrrolidone)-acrylate-methacrylic acid terpolymer, and mixtures thereof, present in an amount from about 1 to about 30 weight percent of the aqueous chemical treating composition, wherein the ratio of the mers in the copolymer and terpolymer is in the range from 99:1:0 to 1:99:0 to 1:0:99 for vinylpyrrolidone:acrylate:acrylic and;
   e. water in an amount to give a total solids in the range of about 1 to about 50 weight percent for application of the chemical treating composition to the glass fibers.

12. Glass fibers treated with a chemical treating composition of claim 11, wherein the copolymer is dissolved, emulsified or dispersed in an organic carrier.

13. Glass fibers treated with a chemical treating composition of claim 11, wherein the terpolymer has acrylic functionality neutralized with basic compound to improve the water solubility of the terpolymer.

14. Glass fibers treated with a chemical treating composition of claim 13, wherein the base is selected from the group consisting of amino alcohol and dialkyl amine.

15. Glass fibers treated with a chemical treating composition of claim 11, wherein the terpolymer has 67 weight percent of vinyl pyrrolidone, 25 weight percent of ethylmethacrylate and the remainder percentage as methacrylic acid.

16. Glass fibers having an aqueous chemical treating composition comprised of:
   a. an epoxy polymer present as a liquid, an epoxy dispersion, or emulsion with sufficient surfactants to maintain the dispersion or emulsion in a predominant amount of the chemical treating composition on a nonaqueous dried basis, b. at least one aminofunctional organosilane in an effective coupling agent amount, c. at least one cationic fiber lubricant in an amount in the range of about 1 to about 5 weight percent, d. an epoxy polymer curing agent present in an amount of about 1 to 5 weight percent, e. a poly(vinylpyrrolidone) copolymer selected from the group of poly(vinylpyrrolidone acrylic) copolymer and poly(vinylpyrrolidone-acrylate-acrylic) terpolymer and poly(vinylpyrrolidone)-acrylate-methacrylic acid terpolymer where the acrylic or methacrylic acid or mixture thereof is neutralized with an evaporative base in a water-solubilizing amount and where the copolymer is dissolved, emulsified or dispersed in an organic solvent and where the copolymer is present in an amount from about 1 to about 30 weight percent of the aqueous chemical treating composition but present in a lesser amount to that of the epoxy polymer, but where the ratio of epoxy polymer to the copolymer does not exceed 60:1, and f. water in an amount to provide a total solids for the chemical treating composition in the range of about 1 to about 50 weight percent for application to glass fibers.

17. Chemically treated glass fibers of claim 16 wherein the copolymer has 68 weight percent of the poly(vinylpyrrolidone), 30 weight percent of the ethylmethacrylate, and 2 weight percent of the methacrylic acid.

18. Process of reinforcing phenolic polymers, comprising: mixing curable phenolic matrix polymer with fillers or glass fibers having a moisture-reduced residue of an aqueous chemical treating composition having:

a. at least one film forming polymer in an effective film forming amount, b. at least one organofunctional silane coupling agent in an effective coupling agent amount, c. at least one cationic fiber lubricant in an effective lubricating amount, d. poly(vinylpyrrolidone-acrylate or acrylic) copolymer present in an amount from about 1 to about 30 weight percent of the aqueous chemical treating composition having a ratio of poly(vinylpyrrolidone) to acrylate or acrylic or mixture of acrylate or acrylic in the range of 99:1 to 1:99, and e. water in an effective amount for application of the chemical treating composition to the glass fibers.

19. Strands of glass fibers with a chemical treating composition of claim 1, wherein the water soluble poly(vinylpyrrolidone) copolymer is selected from the group consisting of: base neutralized poly(vinylpyrrolidone) copolymer, poly(vinylpyrrolidone) copolymer having at least 70 parts vinylpyrrolidone to 30 parts of alkyl acrylate, and poly(vinylpyrrolidone) copolymers having a water solubilizing amount of acrylic acid.

20. Chemically treated glass fibers of claim 11, wherein the water soluble poly(vinylpyrrolidone) copolymer is selected from the group consisting of: base neutralized copolymer, copolymer having at least 70 parts vinylpyrrolidone to 30 parts of alkyl acrylate, copolymers having less than 70 parts vinyl pyrrolidone to 30 parts alkylacrylate and having vinyl pyrrolidone-reactable ionomer functionality that is base neutralized, and copolymers having a water solubilizing amount of acrylic acid.

21. Glass fibers treated with a chemical treating composition of claim 11, wherein the treating composition on the fibers is present as the dried residue of the chemical treating composition where in this dried residue the poly(vinylpyrrolidone) terpolymer has reactable carboxylic acid groups.

22. Glass fibers of claim 11, wherein the film forming polymer is an epoxy polymer present as an epoxy dispersion, emulsion, or as a liquid.

23. Glass fibers of claim 11, wherein the organofunctional silane coupling agent is an aminofunctional organosilane.

24. Glass fibers of claim 16, wherein the evaporative base is selected from the group consisting of amino alcohols and dialkylamines.

25. Glass fibers of claim 16, wherein the epoxy polymer is present in an amount in the range from 50 to 80 weight percent, and the amount of the aminofunctional organosilane is in the range of 1 to 5, and the amount of the cationic fiber lubricant is in the range of from 1 to 6, and the amount of the epoxy polymer curing agent or second cationic lubricant is in the range of from 1 to 6, and the amount of the poly(vinylpyrrolidone) copolymer is in the range of from 5 to 20 where all weight percents are based on the components is a dry condition.

26. Glass fibers of claim 19 wherein the base neutralized poly(vinylpyrrolidone) has less than 70 parts vinyl pyrrolidone to 30 parts alkylacrylate and has vinyl pyrrolidone-reactable ionomer functionality that is base neutralized.

27. Strands of glass fibers of claim 2, wherein the carrier is selected from alcohols and butyl Cellosolve.

28. Glass fibers of claim 16 wherein the epoxy curing agent is selected from the group of monovalent tertiary amine bases and high molecular weight imidazoline.

* * * * *